US 12,158,879 B2

United States Patent
Hildebrandt et al.

(10) Patent No.: US 12,158,879 B2
(45) Date of Patent: Dec. 3, 2024

(54) CLOUD PLATFORM AND METHOD FOR EFFICIENT PROCESSING OF POOLED DATA

(71) Applicant: Siemens Aktiengesellschaft, Munich (DE)

(72) Inventors: Marcel Hildebrandt, Munich (DE); Thomas Hubauer, Garching Bei Munchen (DE); Serghei Mogoreanu, Munich (DE); Ingo Thon, Grasbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 649 days.

(21) Appl. No.: 17/413,891

(22) PCT Filed: Dec. 9, 2019

(86) PCT No.: PCT/EP2019/084209
§ 371 (c)(1),
(2) Date: Jun. 14, 2021

(87) PCT Pub. No.: WO2020/120391
PCT Pub. Date: Jun. 18, 2020

(65) Prior Publication Data
US 2022/0129363 A1 Apr. 28, 2022

(30) Foreign Application Priority Data
Dec. 11, 2018 (EP) ...................................... 18211594

(51) Int. Cl.
*G06F 16/24* (2019.01)
*G06F 11/34* (2006.01)
(Continued)

(52) U.S. Cl.
CPC .......... *G06F 16/24* (2019.01); *G06F 11/3409* (2013.01); *G06F 11/3452* (2013.01);
(Continued)

(58) Field of Classification Search
None
See application file for complete search history.

(56) References Cited

U.S. PATENT DOCUMENTS 8,732,118 B1 * 5/2014 Cole ...................... G06F 16/254
707/602
9,535,902 B1 * 1/2017 Michalak ............ G06F 16/3331
(Continued)

FOREIGN PATENT DOCUMENTS

CN 104521178 A 4/2015

OTHER PUBLICATIONS

International Search Report and Written Opinion in corresponding PCT Patent Application No. PCT/EP2019/084209 dated Jan. 22, 2020. 14 pages.

*Primary Examiner* — Adam Lee
(74) *Attorney, Agent, or Firm* — Schmeiser, Olsen & Watts LLP

(57) ABSTRACT

A computer-implemented method for efficient processing of pooled data shared by users of a cloud platform, the method includes the steps of uploading at least one dataset by a client device of a user to said cloud platform; calculating similarity scores indicating a degree of similarity between the current uploaded dataset and datasets previously uploaded by client devices of other users; and performing a procedure selected by a user on the cloud platform based on pooled data including the current dataset of the respective user and the datasets previously uploaded from client devices of other users stored in a database of the cloud platform having calculated similarity scores in relation to the
(Continued)

current uploaded dataset of the respective user exceeding a configurable similarity score threshold, is provided.

20 Claims, 2 Drawing Sheets

(51) Int. Cl.
*G06F 18/214* (2023.01)
*G06F 18/22* (2023.01)
*G06N 3/04* (2023.01)
*G06N 3/08* (2023.01)
*H04L 9/00* (2022.01)

(52) U.S. Cl.
CPC .......... *G06F 18/2155* (2023.01); *G06F 18/22* (2023.01); *G06N 3/04* (2013.01); *G06N 3/08* (2013.01); *H04L 9/008* (2013.01)

(56) References Cited

U.S. PATENT DOCUMENTS

| | | | | |
|---|---|---|---|---|
| 10,466,978 | B1* | 11/2019 | Vidan | G06N 7/01 |
| 2007/0192317 | A1* | 8/2007 | Finley | G06Q 30/02 |
| 2007/0239778 | A1* | 10/2007 | Gallagher | G06V 20/30 |
| 2011/0179064 | A1* | 7/2011 | Russo | H04W 4/023 707/769 |
| 2011/0289026 | A1* | 11/2011 | Kannan | G06Q 30/00 707/E17.014 |
| 2012/0254246 | A1 | 10/2012 | Kerger et al. | |
| 2012/0323968 | A1* | 12/2012 | Yih | G06F 16/31 707/E17.069 |
| 2013/0275752 | A1 | 10/2013 | Zhang et al. | |
| 2014/0195818 | A1 | 7/2014 | Neumann et al. | |
| 2014/0280222 | A1* | 9/2014 | Braytenbaum | G06F 16/24578 707/748 |
| 2015/0032768 | A1* | 1/2015 | Miller | G06Q 10/02 707/769 |
| 2015/0347591 | A1* | 12/2015 | Bax | G06Q 50/01 707/749 |
| 2016/0119119 | A1* | 4/2016 | Calapodescu | G06F 21/6227 380/30 |
| 2017/0025125 | A1* | 1/2017 | Alvarez Guevara | G10L 15/02 |
| 2017/0061322 | A1* | 3/2017 | Chari | H04L 63/1425 |
| 2017/0154282 | A1* | 6/2017 | Rossi | G06V 10/94 |
| 2018/0096077 | A1 | 4/2018 | Srivastava | |
| 2018/0113888 | A1* | 4/2018 | Peña Muñoz | G06F 16/56 |
| 2018/0114334 | A1* | 4/2018 | Desai | G06V 10/82 |
| 2018/0181641 | A1 | 6/2018 | Das et al. | |
| 2018/0225372 | A1* | 8/2018 | Lecue | G06F 16/36 |
| 2018/0308000 | A1* | 10/2018 | Dukatz | G06N 10/00 |
| 2019/0065983 | A1* | 2/2019 | Bandaru | G06Q 30/0254 |
| 2019/0080352 | A1* | 3/2019 | Modarresi | G06F 16/2465 |
| 2019/0205475 | A1* | 7/2019 | Ulfelder, Jr. | G06F 16/3334 |
| 2019/0311614 | A1* | 10/2019 | Yang | G08G 1/052 |
| 2020/0042626 | A1* | 2/2020 | Curtis | G06F 16/2443 |
| 2020/0177485 | A1* | 6/2020 | Shurtleff | H04L 41/142 |
| 2021/0367786 | A1* | 11/2021 | Sheets | H04W 12/02 |

\* cited by examiner

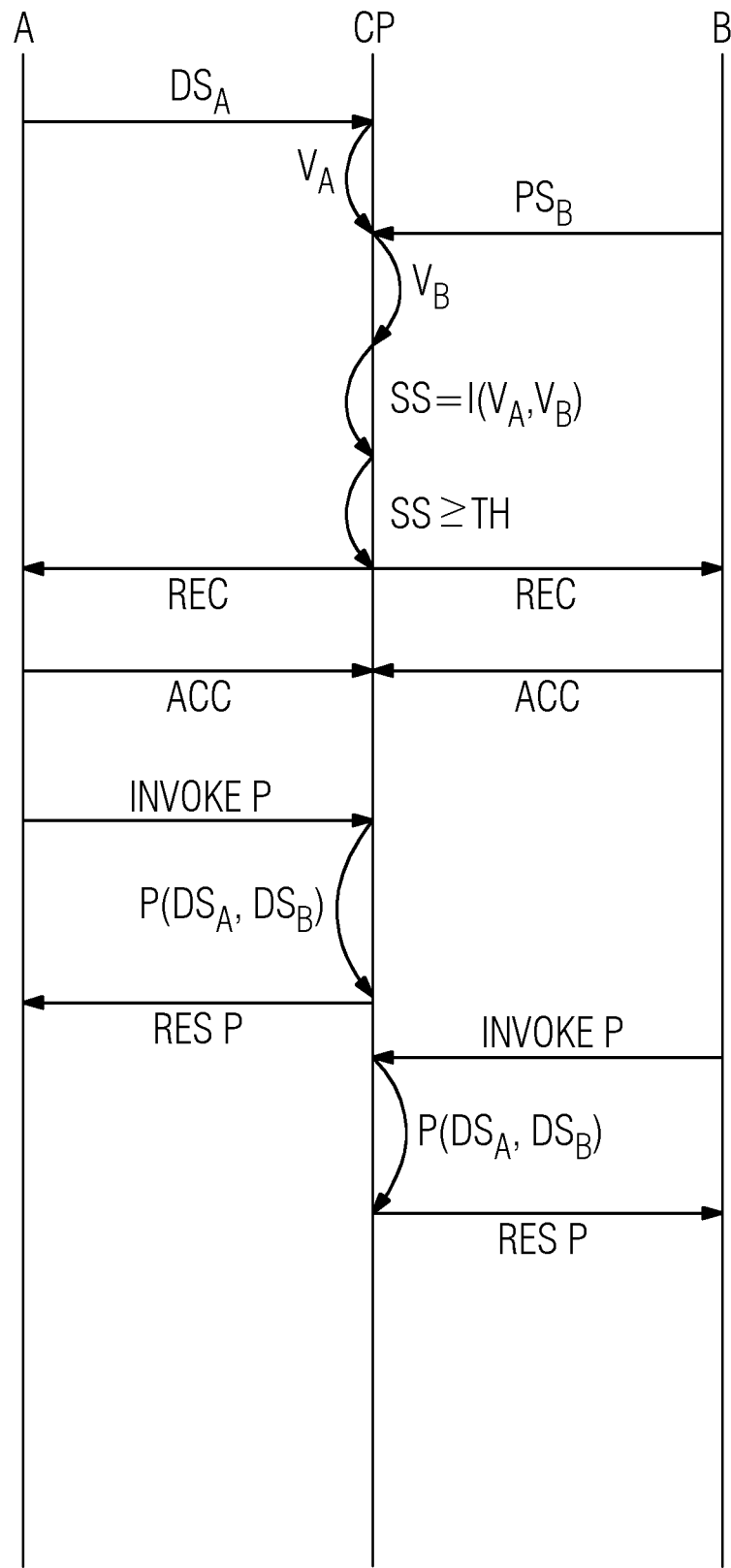

CLOUD PLATFORM AND METHOD FOR EFFICIENT PROCESSING OF POOLED DATA

CROSS-REFERENCE TO RELATED APPLICATIONS

This application is a national stage entry of PCT Application No. PCT/EP2019/084209 having a filing date of Dec. 9, 2019, which claims priority to European Patent Application No. 18211594.9, having a filing date of Dec. 11, 2018, the entire contents of which are hereby incorporated by reference.

FIELD OF TECHNOLOGY

The following relates to a computer-implemented method for efficient processing of pooled data shared by users of a cloud platform.

BACKGROUND

Cloud platforms are connected via a network to a plurality of client devices of different users or customers. The client devices can upload data to a database of the cloud platform. These data can comprise for instance sensor data generated by sensors of machines in industrial systems of the respective users. Further, the cloud platform can offer different services to the users of the cloud platform. These services can include execution of procedures on the data of the user stored in the database of the cloud platform. For instance, a user can invoke an analytical procedure on the cloud platform which analyzes the stored user data such as sensor data to uncover useful information. The platform returns the result of the analytical procedure via the network back to the client device of the user. The procedures can also comprise training procedures, testing procedures and/or inference procedures used for machine learning of data models. However, conventional cloud platforms do not provide a mechanism which allows users to pool automatically their individual data to generate a data pool so that efficient processing of pooled data by users within the cloud platform is possible.

US 2018/181641 A1 discloses recommending analytic tasks based on similarity of datasets. A system includes a data processor, a matching module, and a recommendation module. The data processor receives an incoming dataset and generates a feature vector for the incoming dataset. The matching module determines similarity measures between the generated feature vector and representative feature vectors for a plurality of datasets in a data base and selects at least one dataset of the plurality of datasets based on the similarity measures. The recommendation module identifies at least one analytic task associated with the selected dataset and recommends the at least one analytic task to be performed on the incoming dataset.

US 2014/195818 A1 A discloses a user device encrypting data and privacy attributes associated with the data. A processing device receives the encrypted data and privacy attributes, receives a signed script from a requester and verifies the signature. If successfully verified, the private key is unsealed and used to decrypt the privacy attributes and script attributes, which are compared to determine if the script respects the privacy attributes. If so, the encrypted data are decrypted and the script processes the private data to generate a result that is encrypted using a key of the requester and the encrypted result is then output.

SUMMARY

Accordingly, an aspect of the present invention is to provide a method and a system for efficient processing of pooled data shared by users of a cloud platform.

This is achieved according to a first aspect of the present invention by a computer-implemented method.

The present invention provides according to the first aspect a computer-implemented method for efficient processing of pooled data shared by users of a cloud platform, the method comprising the steps of:

uploading at least one dataset by a client device of a user to the cloud platform, calculating similarity scores indicating a degree of similarity between the current uploaded dataset and datasets previously uploaded by client devices of other users and performing a procedure selected by a user on the cloud platform based on pooled data including the current dataset of the respective user and the datasets previously uploaded from client devices of other users stored in a database of the cloud platform having calculated similarity scores in relation to the current uploaded dataset of the respective user exceeding a configurable similarity score threshold, wherein the client device of a user having uploaded a current dataset on the cloud platform receives a recommendation message from the cloud platform to pool datasets of other users of the cloud platform matching the current dataset, and wherein the matching datasets are pooled automatically to generate a dataset pool if the cloud platform receives an accept message to pool datasets from the client device of the user.

In a possible embodiment of the method according to the first aspect of the present invention, the procedure performed by the cloud platform based on the pooled data comprises a training procedure used for training a data model.

In a further possible embodiment of the method according to the first aspect of the present invention, the procedure performed by the cloud platform based on the pooled data comprises a testing procedure used to test a trained data model.

In a further possible embodiment of the method according to the first aspect of the present invention, the procedure performed by the cloud platform based on pooled data comprises an inference procedure used to execute a trained and tested data model.

In a possible embodiment of the method according to the first aspect of the present invention, the used data model comprises an artificial neural network.

In a further possible embodiment of the method according to the first aspect of the present invention, for each uploaded dataset a representation vector is computed which comprises vector elements representing statistical properties of the uploaded dataset.

In a further possible embodiment of the method according to the first aspect of the present invention, the similarity score indicating a degree of similarity between uploaded datasets is calculated based on the representation vectors of the uploaded datasets.

In a still further possible embodiment of the method according to the first aspect of the present invention, the calculated similarity score comprises a cosine similarity score.

In a still further possible embodiment of the method according to the first aspect of the present invention, if the similarity score calculated for a current uploaded dataset in relation to a previously uploaded dataset of another user exceeds a configurable similarity score threshold, the respective previously uploaded and stored dataset is marked as a matching dataset with respect to the dataset currently uploaded by the client device of the user.

In a still further possible embodiment of the method according to the first aspect of the present invention, the pooled data comprises datasets uploaded from client devices of different users marked as matching datasets.

In a still further possible embodiment of the method according to the first aspect of the present invention, calculating similarity scores with respect to previously uploaded datasets of other users stored in a database of said cloud platform is triggered in response to uploading a new current dataset from the client device of the respective user.

In a still further possible embodiment of the method according to the first aspect of the present invention, the matching datasets undergo a homomorphic encryption before they are pooled to generate a dataset pool.

In a still further possible embodiment of the method according to the first aspect of the present invention, the procedure selected by the user is performed on the cloud platform both on the basis of the generated dataset pool and on the basis of the current dataset uploaded by the client device of the user on the cloud platform to calculate a benchmark indicating an efficiency increase in processing the uploaded dataset by the selected procedure caused by data pooling.

In a further possible embodiment of the method according to the first aspect of the present invention, the calculated benchmark is sent by the cloud platform to the client device of the user.

In a possible embodiment of the method according to the first aspect of the present invention, the datasets comprise labelled data.

In a further possible embodiment of the method according to the first aspect of the present invention, the datasets comprise unlabelled data.

The present invention provides according to the second aspect a cloud platform used for efficient processing of pooled data shared by users of the cloud platform, wherein the cloud platform comprises
  a database adapted to store datasets uploaded to the cloud platform by client devices of users,
  a score calculation unit configured to calculate similarity scores each indicating a degree of similarity between a currently uploaded dataset and previously uploaded datasets stored in said database and
  a processor adapted to execute a procedure selected by a user based on pooled data including the current uploaded dataset of the respective user and previously uploaded datasets of other users having calculated similarity scores in relation to the currently uploaded dataset of the respective user exceeding a configurable similarity threshold, wherein the client device of a user having uploaded a current dataset on the cloud platform receives a recommendation message from the cloud platform to pool datasets of other users of the cloud platform matching the current dataset, and
  wherein the matching datasets are pooled automatically to generate a dataset pool if the cloud platform receives an accept message to pool datasets from the client device of the user.

BRIEF DESCRIPTION

Some of the embodiments will be described in detail, with reference to the following figures, wherein like designations denote like members, wherein:

FIG. 3 depicts a signal diagram for illustrating the operation of a computer-implemented method for efficient processing of pooled data shared by users of a cloud platform according to the present invention.

DETAILED DESCRIPTION

Figure 1:
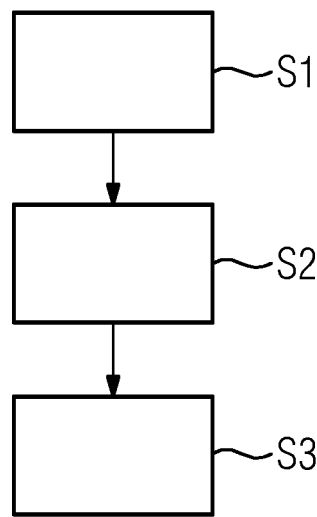
FIG. 1 depicts a flowchart of a possible exemplary embodiment of a computer-implemented method according to the first aspect of the present invention.

As can be seen in the flowchart of FIG. 1, a computer-implemented method for efficient processing of pooled data shared by users of a cloud platform 1 according to the first aspect of the present invention comprises in the illustrated embodiment three main steps.

In a first step S1, at least one dataset DS is uploaded by a client device of a user to the cloud platform 1. The dataset DS is uploaded from the client device of the user via a network to a server 2 of the cloud platform 1 implementing a score calculation unit 2A and a processing unit 2B as also illustrated in the block diagram of FIG. 2. The dataset DS can comprise labelled data or unlabeled data. The dataset DS can for example comprise sensor data generated by sensors of a machine of a user and uploaded by the client device to the cloud platform 1. The client device can comprise an edge device of an automation system. In a possible embodiment, the user data such as sensor data can undergo preprocessing performed by a processor of the client device. In a possible embodiment, the dataset DS can comprise a data structure or a data packet. The data structure of the datasets DS can comprise meta data describing the uploaded user data. In a possible embodiment, the dataset DS is pushed by the client device via the network to the cloud platform 1. In an alternative embodiment, the cloud platform 1 can pull datasets DS from the client device of the user, for instance periodically.

In a further step S2, similarity scores SS indicating a degree of similarity between the current uploaded dataset DS and other datasets DS previously uploaded by a client device of other users is calculated. In a possible embodiment, for each uploaded dataset DS, a representation vector is computed which comprises vector elements representing statistical properties of the uploaded dataset DS. These statistical properties can for instance comprise mean values or standard deviations, etc. The representation vector can comprise the most common statistical features of a given dataset DS. In a possible embodiment, the similarity score SS indicating a degree of similarity between uploaded datasets is calculated in step S2 based on the representation vectors of the uploaded datasets DS. The calculated similarity score SS can comprise in a possible embodiment a cosine similarity score. In a possible embodiment, if the similarity scores SS calculated for a current uploaded dataset DS in relation to a previously uploaded dataset DS of another user exceeds a configurable similarity score threshold, the respective previously uploaded and stored dataset DS can be marked as a matching dataset DS with respect to the dataset DS currently uploaded by the client device of the user. Accordingly, whenever a pairwise similarity between two datasets DS exceeds a configurable threshold, the platform 1 can denote it as a match.

In a further step S3, a procedure selected by a user on the cloud platform 1 is performed based on pooled data. The pooled data can include the current dataset DS of the respective user recently uploaded by the user and datasets DS previously uploaded from client devices of other users stored in a database 3 of the cloud platform 1 having calculated similarity scores SS in relation to the current uploaded dataset DS of the respective user exceeding a configurable similarity score threshold TH.

In a possible embodiment, the configurable similarity score threshold TH is set by the service provider of the cloud platform 1. In an alternative embodiment, the configurable similarity score threshold TH can be applied by the user selecting a procedure to be performed by a processing unit 2B of the cloud platform 1. In this embodiment, the user of the cloud platform 1 can adjust the required similarity score threshold TH to define how similar the other datasets DS of other users have to be to be pooled with the datasets DS provided by himself.

To select the procedure in step S3, the client device of the user can invoke a procedure provided by the cloud platform 1. The procedure can be for instance an analytical procedure performing data analysis of the pooled dataset DS. The analytical procedure can for instance be a predictive maintenance procedure predicting when a component of the automation system of the user may fail. This analytical predictive maintenance procedure is more accurate when performed on a plurality of pooled data comprising datasets DS of a plurality of users having similar or identical machines in their respective automation systems.

The procedure selected by a user can comprise in a possible embodiment also a training procedure used for training a data model, in particular an artificial neutral network ANN. The procedure selected or invoked by the user can also comprise a testing procedure used to test a trained data model, in particular a trained artificial neural network ANN. The procedure selected or invoked by the user can comprise further an inference procedure used to execute a trained and tested data model, in particular a trained and tested artificial neural network ANN.

The cloud platform 1 performs pooling of datasets DS depending on the calculated similarity scores SS. The pooled data comprises datasets DS uploaded from client devices of different users marked as matching datasets DS. In a possible embodiment, the calculation of the similarity scores SS in step S2 with respect to previously uploaded datasets DS of other users stored in the database 3 of the cloud platform 1 can be triggered in response to uploading a new current dataset DS from the client device of the respective user. The client devices of a user having uploaded a current dataset DS onto the cloud platform 1 receives a recommendation message from the cloud platform 1 to pool datasets DS of other users of the cloud platform 1 matching the current data, i.e. having calculated similarity scores SS in relation to the current uploaded dataset DS of the respective user exceeding a configurable similarity score threshold TH. The matching datasets DS are pooled automatically to generate a dataset pool only if the cloud platform 1 receives an accept message to pool datasets DS from the client device of the user. The user has full control whether his dataset DS is pooled with datasets DS of other users or not.

In a possible embodiment of the computer-implemented method according to the present invention, the matching datasets DS undergo homomorphic encryption before they are pooled to generate a dataset DS. Accordingly, before data is shared between users, a homomorphic encryption is applied to the data. Homomorphic encryption is a way of encrypting the data that allows to perform computations such that the results of this computation, when encrypted, match the results of the same computational procedure on the un-encrypted data. Homomorphic encryption is used for secure outsourced computation, i.e. the performance of the selected procedure on a processing resource of the cloud platform 1.

In a further possible embodiment of the computer-implemented method according to the first aspect of the present invention, the procedure selected by the user is performed on a processor of the cloud platform 1 both on the basis of the generated dataset pool and on the basis of the current dataset DS uploaded by the client device of the user on the cloud platform 1 to calculate a benchmark indicating an efficiency increase in processing the uploaded dataset DS as a selected procedure caused by data pooling. In a possible embodiment, the calculated benchmark can be sent by the cloud platform 1 back to the client device of the user. In this embodiment, the user is informed about the impact of the data pooling on the result of the performed procedure. The user can be informed about the efficiency increase in performing the procedure caused by the data pooling.

Figure 2:
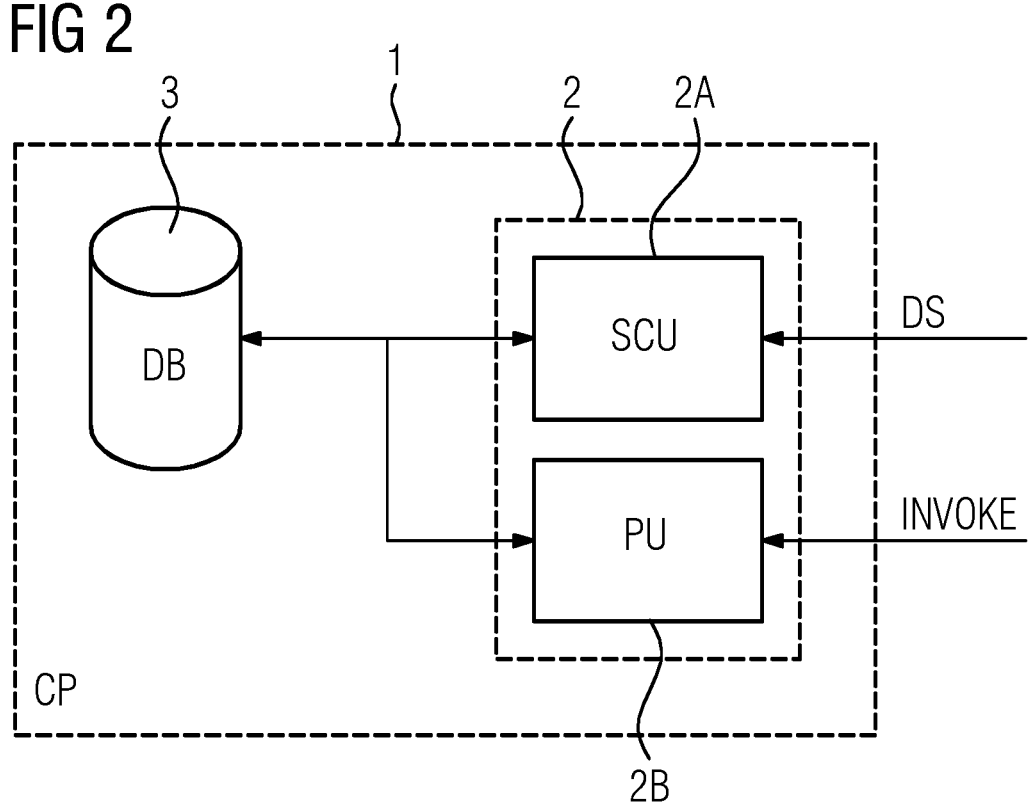
FIG. 2 depicts a block diagram for a possible exemplary embodiment of a cloud platform according to a further aspect of the present invention.

FIG. 2 shows a block diagram of a possible exemplary embodiment of a cloud platform 1 according to an aspect of the present invention. The cloud platform 1 is used for efficient processing of pooled data shared by users of the cloud platform 1. A plurality of client devices can be connected to the cloud platform 1 via a network, in particular the Internet. The cloud platform 1 as illustrated in FIG. 2 can comprise a server 2 having access to a database 3. The database 3 can be a central database but also a distributed database. The server 2 can implement in the illustrated exemplary embodiment a score calculation unit (SCU) 2A and a processing unit (PU) 2B. The score calculation unit 2A is configured to calculate similarity scores SS each indicating a degree of similarity between at least one currently uploaded dataset DS and previously uploaded datasets DS stored in the database 3 of the cloud platform 1. The processing unit 2B of the server 2 can be adapted to execute a procedure selected or invoked by a user based on pooled data including the current uploaded dataset DS of the respective user and previously uploaded datasets of other users having calculated similarity scores SS in relation to the currently uploaded dataset DS of the respective user exceeding a configurable similarity threshold TH. The similarity threshold TH can be configured by the provider of the cloud platform 1 or can be submitted to the cloud platform 1 by the client device of the user when invoking the respective procedure. The procedure executed by the processing unit 2B based on the pooled data can comprise in a possible embodiment an analytical procedure analyzing the pooled data. The procedure executed by the processing unit 2B can also comprise a training procedure for training a data model, a testing procedure used to test a trained data model and/or an inference procedure used to execute a trained and tested data model. This data model can comprise in a possible embodiment an artificial neural network ANN, for example a feedforward neural network or a recurrent neural network. The artificial neural network ANN can comprise an input layer, several hidden layers and an output layer. In a possible embodiment, a user can indicate whether the uploaded dataset DS shall the used for a training procedure, a testing procedure and/or an inference procedure of a specific data model. In a possible embodiment, the user can also specify the type of the used data model, in particular the type of artificial neural network ANN to be used for the respective invoked procedure. The processing unit 2B is adapted to execute the procedure selected by the user based on the pooled data including the current uploaded dataset DS of the respective user and previously uploaded datasets DS of other users having calculated similarity scores SS in relation to the currently uploaded dataset DS of the respective user exceeding the configurable similarity threshold TH. The calculated result of the procedure can be returned to the client device of the user having invoked the procedure. Further, the client device of the user can receive in a possible embodiment a benchmark indicating an efficiency increase in processing the uploaded dataset DS by the selected procedure caused by the performed data pooling.

FIG. 3 shows a diagram for illustrating the operation of a computer-implemented method for efficient processing of a pooled data shared by a user of a cloud platform 1.

In the illustrated example, two users A, B are connected via a data network to a common cloud platform CP such as the cloud platform 1 illustrated in FIG. 2. In the illustrated example, the first user A uploads a dataset $DS_A$ to the cloud platform CP. Based on the uploaded dataset $DS_A$ the cloud platform 1 calculates a representation vector $V_A$ comprising vector elements representing statistical properties of the uploaded dataset $DS_A$ such as mean values or standard deviations.

When the other user B uploads a dataset $DS_B$ to the cloud platform, a representation vector $V_B$ is computed in the same way as illustrated in FIG. 3. On the basis of the two calculated representation vectors $V_A$, $V_B$, a similarity score SS is calculated using a predefined similarity score function. In a possible embodiment, the similarity score SS calculated by the processing unit 2B of the cloud platform 1 comprises a cosine similarity score. The processing unit 2B comprises a comparator adapted to compare the calculated similarity score SS with a configurable similarity score threshold value TH as illustrated in FIG. 3. In the illustrated embodiment, if the calculated similarity score SS exceeds the preconfigured similarity score threshold value TH, both users A, B receive from the cloud platform 1 a recommendation REC to share their data. The recommendations REC are transmitted by the server 2 of the cloud platform 1 to the client devices of the users A, B. The client device of a user having uploaded a current dataset DS onto the cloud platform 1 receives a recommendation message REC from the cloud platform 1 to pool his dataset DS with datasets DS of other users of the cloud platform 1 matching the current dataset DS, i.e. having a similarity score SS exceeding the threshold value TH. The matching datasets DS are pooled automatically to generate a dataset pool if the cloud platform 1 receives an accept message ACC to pool datasets DS from the client devices of the respective users as also illustrated in FIG. 3. In a possible embodiment, the matching datasets DS undergo automatically a homomorphic encryption performed by the processing unit 2B of the server 2 before they are pooled to generate a dataset pool. A procedure P selected by a user is performed on the cloud platform 1 on the basis of the pooled data. In the example illustrated in FIG. 3, the user A invokes a procedure P which is performed on the dataset $DS_A$ of the user A but also on the dataset $DS_B$ of the user B. The result of the invoked procedure is returned to the client device of the user A as shown in FIG. 3. Similarly, if the other user B invokes the same procedure P, the procedure is also performed on the pooled data comprising the dataset $DS_A$ of user A and the dataset $DS_B$ of user B as shown in FIG. 3. The result of the invoked procedure P is returned to the client device of the user B as shown in FIG. 3.

In a further possible embodiment, the invoked procedure P can also be performed both on the basis of the generated dataset pool providing a first result and on the basis of the current dataset DS uploaded by the client device of the user only to provide a further result, wherein the difference between the two results can form a benchmark indicating an efficiency increase in processing the uploaded dataset DS by the invoked procedure caused by data pooling. In this embodiment, the user can recognize an efficiency increase caused by data pooling and will be more likely to accept data pooling when receiving a recommendation message REC from the cloud platform 1 next time. In a possible embodiment, the efficiency increase can be calculated by the cloud platform 1 and supplied to the client device of the user to be displayed to the user via a user interface of the client device. Most analytical procedures are designed such that they benefit from as much data as possible and can be executed more efficiently if many data sets from different users are pooled in a data pool. Pooling of data is in particular beneficial when performing training procedures of machine learning data models, in particular artificial neural networks ANN. In a possible embodiment, the cloud platform 1 can monitor users that are building machine learning models on a joined platform and can inform them about the benefits from pooling the data together. To increase security, the provided data can be encrypted before sharing them with other users in a data pool. In a preferred embodiment, the provided user data undergoes homomorphic encryption before being pooled in a data pool. The computer-implemented method allows for automatic sharing of user data on a cloud platform 1. In a possible embodiment, the pooled data is used for training data models, in particular artificial neural networks ANN. A data model is trained from data that can be defined in a possible embodiment by recipes which may come in the form of Docker containers, shell scripts, KNIME workflows, etc. Analytical services or procedures P can be provided by the cloud platform 1 to train and/or build data models by executing the recipes on specified datasets DS. The computer-implemented method according to the present invention can in a possible embodiment automatically retrain the user's data model on combined pooled datasets DS. The cloud platform 1 provides a feedback mechanism which informs the user about the expected or achieved benefits of pooling their data. A data evaluation engine implemented in the score calculation unit 2A can measure levels of similarity between datasets DS and decide whether it makes sense to combine them or not. In a possible embodiment, each dataset DS uploaded by a client device of a user of the cloud platform 1 can compute and combine two numerical vectors. The first vector V contains the most common statistical features such as mean values or standard deviation for a given dataset DS. The second vector can contain features that are highly relevant for the respective procedure P available on the cloud platform 1. Whenever a new procedure P is introduced into the cloud platform 1, the second vector can be enhanced with additional features.

Each pair of datasets DS uploaded by different users of the cloud platform 1 can compute similarity scores SS based on the representation vectors. There exist many different similarity measures that can be used by the score calculation unit 2A for this purpose such as cosine similarity. Whenever the pairwise similarity between two datasets DS exceeds a configurable threshold, the score calculation unit 2A can denote it as matching datasets DS.

Whenever a match is detected by the cloud platform 1, there is a reason to believe that the datasets DS these users are working on are similar. The cloud platform 1 then can compare the procedures P that these users are typically invoking on their data. If a match is detected, it is evident that both users can benefit from sharing data between them. The cloud platform 1 can then issue a recommendation REC to both users to share their data between them to increase the quality of the results of the executed procedure. For instance, if the executed procedure P is a training procedure, the quality of the machine learned data model is increased.

Optionally, before issuing the recommendation REC, the cloud platform 1 can retrain some of the data models previously created by the users on a combined dataset DS of pooled data to quantify the increase in the quality of the data models.

If the recommendation REC to share the datasets DS is accepted by the users, whenever one of the users invokes the respective procedure P, the same actions can be performed by the cloud platform 1 on the combined datasets DS. The results of the performed procedure P can become available to both involved users. To ensure data privacy of the users, homomorphic encryption is applied on the datasets DS before sharing the data. Alternatively, the execution of the procedure such as training of a data model can be performed in a secured environment of the cloud platform 1 where the data is not available to the user. In a possible embodiment, the cloud platform 1 can automatically identify users that would benefit from sharing data or information contained in their datasets DS. The cloud platform 1 provides incentives for users to upload and share their data. For example, shared data used for training of data models results in better data models for the user requiring less labelled data. As it is expensive and time-consuming to collect labelled data, the cloud platform 1 increases the efficiency when training data models significantly.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A computer-implemented method executed by a cloud platform, the method comprising:
   receiving uploads including a plurality of datasets including a current uploaded dataset of a client device of a user and datasets previously uploaded by client devices of other users to the cloud platform, wherein the datasets include sensor data generated by sensors of one or more machines in an industrial system;
   sending a recommendation message to the client device to pool a subset of the datasets previously uploaded with the current uploaded dataset, wherein the subset includes at least one dataset of the datasets previously uploaded exceeding a configurable threshold for similarity scores, and wherein the similarity scores each indicate a degree of similarity between the current uploaded dataset and the datasets previously uploaded by the client devices of the other users;
   receiving an accept message from the client device;
   in response to receiving the accept message, executing a training procedure or a testing procedure, wherein the training procedure trains a data model on the cloud platform using the current uploaded dataset and the subset of the datasets previously uploaded, and wherein the testing procedure tests a data model trained on the cloud platform using the current uploaded dataset and the subset of the datasets previously uploaded; and
   executing the trained data model on the cloud platform after executing the training procedure or executing the tested data model on the cloud platform after executing the testing procedure.

2. The method according to claim 1, wherein the data model comprises an artificial neural network (ANN).

3. The method according to claim 1, wherein each uploaded dataset is associated with a representation vector comprising vector elements representing statistical properties of the respective uploaded dataset.

4. The method according to claim 3, wherein each similarity score is based on the representation vectors of the respective uploaded datasets.

5. The method according to claim 1, wherein each similarity score comprises a cosine similarity score.

6. The method according to claim 1, wherein if the similarity score for the current uploaded dataset in relation to a previously uploaded dataset of another user exceeds the configurable threshold, the previously uploaded dataset is marked as a matching dataset with respect to the current uploaded dataset.

7. The method according to claim 6, wherein the pooled data comprises datasets uploaded from client devices of different users marked as matching datasets.

8. The method according to claim 6, wherein matching datasets undergo homomorphic encryption before being included in the pooled data.

9. The method according to claim 8, wherein a benchmark indicating an efficiency increase in pooling datasets is based at least on the current dataset.

10. The method according to claim 9, wherein the benchmark is sent by the cloud platform to the client device of the user.

11. The method according to claim 1, wherein a new similarity score with respect to the previously uploaded datasets of the other users stored in a database of the cloud platform is based on uploading a new current dataset to the cloud platform from the client device of the user.

12. The method according to claim 1, wherein the datasets comprise labelled data and/or unlabelled data.

13. A cloud platform including a database, a server, and a processor, the cloud platform configured to execute a method comprising:
    receiving uploads including a plurality of datasets including a current uploaded dataset of a client device of a user and datasets previously uploaded by client devices of other users to the cloud platform, wherein the datasets include sensor data generated by sensors of one or more machines in an industrial system;
    sending a recommendation message to the client device to pool a subset of the datasets previously uploaded with the current uploaded dataset, wherein the subset includes at least one dataset of the datasets previously uploaded exceeding a configurable threshold for similarity scores, and wherein the similarity scores each indicate a degree of similarity between the current uploaded dataset and the datasets previously uploaded by the client devices of the other users;
    receiving an accept message from the client device;
    in response to receiving the accept message, executing a training procedure or a testing procedure, wherein the training procedure trains a data model on the cloud platform using the current uploaded dataset and the subset of the datasets previously uploaded, and wherein the testing procedure tests a data model trained on the cloud platform using the current uploaded dataset and the subset of the datasets previously uploaded; and executing the trained data model on the cloud platform after executing the training procedure or executing the tested data model on the cloud platform after executing the testing procedure.

14. The cloud platform according to claim 13, wherein the data model comprises an artificial neural network (ANN).

15. The cloud platform according to claim 13, wherein each uploaded dataset is associated with a representation vector comprising vector elements representing statistical properties of the respective uploaded dataset.

16. The cloud platform according to claim 15, wherein each similarity score is based on the representation vectors of the respective uploaded datasets.

17. The cloud platform according to claim 13, wherein each similarity score comprises a cosine similarity score.

18. The cloud platform according to claim 13, wherein if the similarity score for the current uploaded dataset in relation to a previously uploaded dataset of another user exceeds the configurable threshold, the previously uploaded dataset is marked as a matching dataset with respect to the current uploaded dataset.

19. The cloud platform according to claim 13, wherein a new similarity score with respect to the previously uploaded datasets of the other users stored in the database of the cloud platform is based on uploading a new current dataset to the cloud platform from the client device of the user.

20. The cloud platform according to claim 13, wherein the datasets comprise labelled data and/or unlabelled data.

* * * * *